US005896273A

United States Patent [19]

Varghese et al.

[11] Patent Number: 5,896,273
[45] Date of Patent: Apr. 20, 1999

[54] MODULAR COMPUTER CHASSIS INTERCHANGEABLE BETWEEN STAND ALONE AND RACK MOUNTED STATES

[75] Inventors: Paily T. Varghese, Tomball; Robert J. Hastings, Humble; Carl E. Davis, Houston, all of Tex.

[73] Assignee: Compaq Computer Corp., Houston, Tex.

[21] Appl. No.: 08/777,819

[22] Filed: Dec. 31, 1996

[51] Int. Cl.$^6$ .................................. G06F 1/16; H05K 5/02
[52] U.S. Cl. ...................... 361/724; 361/683; 361/727; 312/223.2
[58] Field of Search .................................. 361/724–727, 361/683, 684, 685, 686; 312/223.1, 233.2; 364/708.1; G06F 1/16

[56] References Cited

U.S. PATENT DOCUMENTS

| | | | |
|---|---|---|---|
| 5,051,868 | 9/1991 | Leverault et al. | 361/395 |
| 5,136,468 | 8/1992 | Wong et al. | 361/393 |
| 5,154,456 | 10/1992 | Moore et al. | 292/162 |
| 5,162,976 | 11/1992 | Moore et al. | 361/393 |
| 5,224,019 | 6/1993 | Wong et al. | 361/393 |
| 5,224,024 | 6/1993 | Tu et al. | 364/429 |
| 5,277,615 | 1/1994 | Hastings et al. | 439/377 |
| 5,332,306 | 7/1994 | Babb et al. | 312/334.16 |
| 5,340,340 | 8/1994 | Hastings et al. | 439/64 |
| 5,392,192 | 2/1995 | Dunn et al. | 361/683 |
| 5,397,176 | 3/1995 | Allen et al. | 312/223.2 |
| 5,406,453 | 4/1995 | Cusato et al. | 361/733 |

*Primary Examiner*—Lynn D. Feild
*Attorney, Agent, or Firm*—Jenkens & Gilchrist, P.C.

[57] ABSTRACT

A modular computer chassis for both rack mounting and free standing use comprising a housing adapted for receipt of a plurality of computer modules in a secured array. The modules are selectively accessible only through a cover panel door which may be locked to secure the integrity of the array. The modules are mounted in the chassis on individual slides which afford alignment and stability in the assembly thereof. Additionally, the modularity affords interchangeability with rack-mounted systems for maximizing the efficiency of operation and the effectiveness of installation and service. Problems within the system can thus be addressed by removing and replacing individual modules in a configuration which affords reliability and easy access.

31 Claims, 7 Drawing Sheets

MODULAR COMPUTER CHASSIS INTERCHANGEABLE BETWEEN STAND ALONE AND RACK MOUNTED STATES

BACKGROUND OF THE INVENTION

1. Technical Field of the Invention

The present invention relates to a computer chassis for free standing use or rack mounting and, more particularly, but not by way of limitation, to a computer chassis constructed with a modular mounting configuration for effecting ease and security in the installation or removal of components therein.

2. Description of Related Art

Early computer designs generally included a chassis with a plurality of individual components and assemblies mounted therein and connected to one another by means of wires, cables, brackets, nuts, bolts and the like. A major computer design advance occurred with the advent of printed circuit boards, integrated circuits and modular component assemblies. The printed circuit boards were, for example, formed of lightweight material and housed a myriad of components which were electrically interconnected with the component assemblies through wiring harnesses. The wiring harnesses and hard wire connections were subsequently replaced by technologically advanced connectors used for integrally coupling the individual components to each other and to other circuitry in the computer. Other advances, such as specially designed clips for minimizing electromagnetic interference (EMI), further enhanced the computers effectiveness and compatibility with other electronic systems.

In the design of electronic equipment, the use of connectors, modular components, and specialized hardware has permitted key components and printed circuit boards to be efficiently added and removed. Such ease in the addition and deletion of computer components and printed circuit boards has facilitated assembly repair, upgrade, and/or changes in functionality. Because the computers of today's complex business world may contain volumes of confidential information, one design aspect has always been security of the data stored in the computer system. Various chassis designs address such issues. For example, U.S. Pat. Nos. 5,154,456 and 5,162,976 (both assigned to the assignee of the present invention), teach security and locking systems for a computer chassis. Security of the disk drives and other computer components has thus been recognized as a valuable design aspect.

Computer reliability and serviceability are also valuable design aspects. Originally, a rule of practice in the maintenance of electrical circuitry, such as computer hardware, was that of always turning the power to the computer off before components or printed circuit boards were added or removed from the computer chassis or support frame. Recent innovations have addressed the desirability to insert and remove modular components and printed cards from electrical equipment, such as computer hardware, when the computer is electrically connected and operational, i.e. "hot." This is now possible for hot pluggable hard drives, and in these cases, the power may be disconnected from only the connector of the drive or modular component to be inserted and removed while allowing the adjacent components to remain "hot."

Removable computer components today include disc drives, drive cages, fans, power supplies, system I/O modules, processor boards, and other subassemblies. As referenced above, the removability of computer components allows for better overall serviceability of the computer system, which is a distinct advantage to both the user and the maintenance technician. A defective power supply in the main or central computer generally requires prompt replacement in order to limit downtime. It is for this reason that modular components and connectors facilitate prompt replacement and are thus popular in many computer designs. For example, U.S. Pat. Nos. 5,332,306 (Jul. 26, 1994) and 5,277,615 (Jan. 11, 1994), both assigned to the assignee of the present invention, teach disk drive mounting systems facilitating these removability features.

The modularity of computer systems is thus recognized as an important design consideration. As referenced above, modules can be removed and examined for operability or other purposes much easier than permanently mounted fixtures within a computer chassis. Because computers provide an integral part of most business operations, it is of utmost importance to maintain the reliability and integrity of the computer system. When the various elements of a computer can be easily removed in a modular form, they can also be replaced to maintain the operational status of the computer. They may also be replaced, however, to remove stored data. It is for this reason that information stored upon circuit boards or disk drives contained within the computer may need to be physically secured in such a way so as not to be readily available for access. Additionally, it is often important to know if any portion of a computer has been accessed or "tampered with" such as in those situations where sensitive data is maintained within some portion of the computer hardware.

The present invention provides such a security system by providing a modular computer chassis and associated specialized hardware specifically adapted for maximum efficiency and modularity with selectively restricted access thereto. Specialized EMI clips, printed circuit board card guides and locking systems are also provided to enhance these features. In this way, security and reliability are provided in a modular array capable of free standing or rack mount assembly.

SUMMARY OF THE INVENTION

The present invention relates to a modular computer chassis with means for reliably securing the modules therein and for use in free standing or rack mounted configurations. More particularly, one aspect of the present invention includes a modular computer chassis comprising a housing having a plurality of compartments formed therein with at least one computer component module adapted for receipt within a compartment of the housing. Mounting means are provided and secured within at least one of the compartments for receipt of the module. Means are provided for securing the module within the compartment of the housing. In the free standing configuration, a cover panel is provided with locking means for securement to the housing to prevent the unauthorized entry therethrough. The individual securing means of the modules are disposed within the housing in regions thereof accessible only through the cover panel. In this manner, access to all modules of the chassis is limited to initial access through the cover panel, which may be locked to secure the entire chassis in the free standing, or "tower" configuration.

In another aspect, the above described invention includes the cover panel being hingedly mounted to the computer chassis. The locking means for the cover panel may comprise a key lock disposed in a portion of the cover panel facilitating access therethrough. The housing of the chassis may be constructed with at least two compartments for receiving computer modules therein. The computer modules may include processor boards, system I/O modules, disk drives, power supplies, display subassemblies, blowers and the like. Each of these is securable within the chassis to permit securement behind the cover panel and may include an ejector mechanism for both securing the module within the chassis and facilitating its removal.

In another aspect, the above-described invention includes an electrically conductive EMI clip secured to a portion of the module adapted for receipt within the chassis or secured to the chassis to make contact with the module. The EMI clip is adapted for electrically interconnecting the compartment of the chassis and the received module one to the other in order to minimize electromagnetic interference.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF THE DRAWINGS

Figure 1:
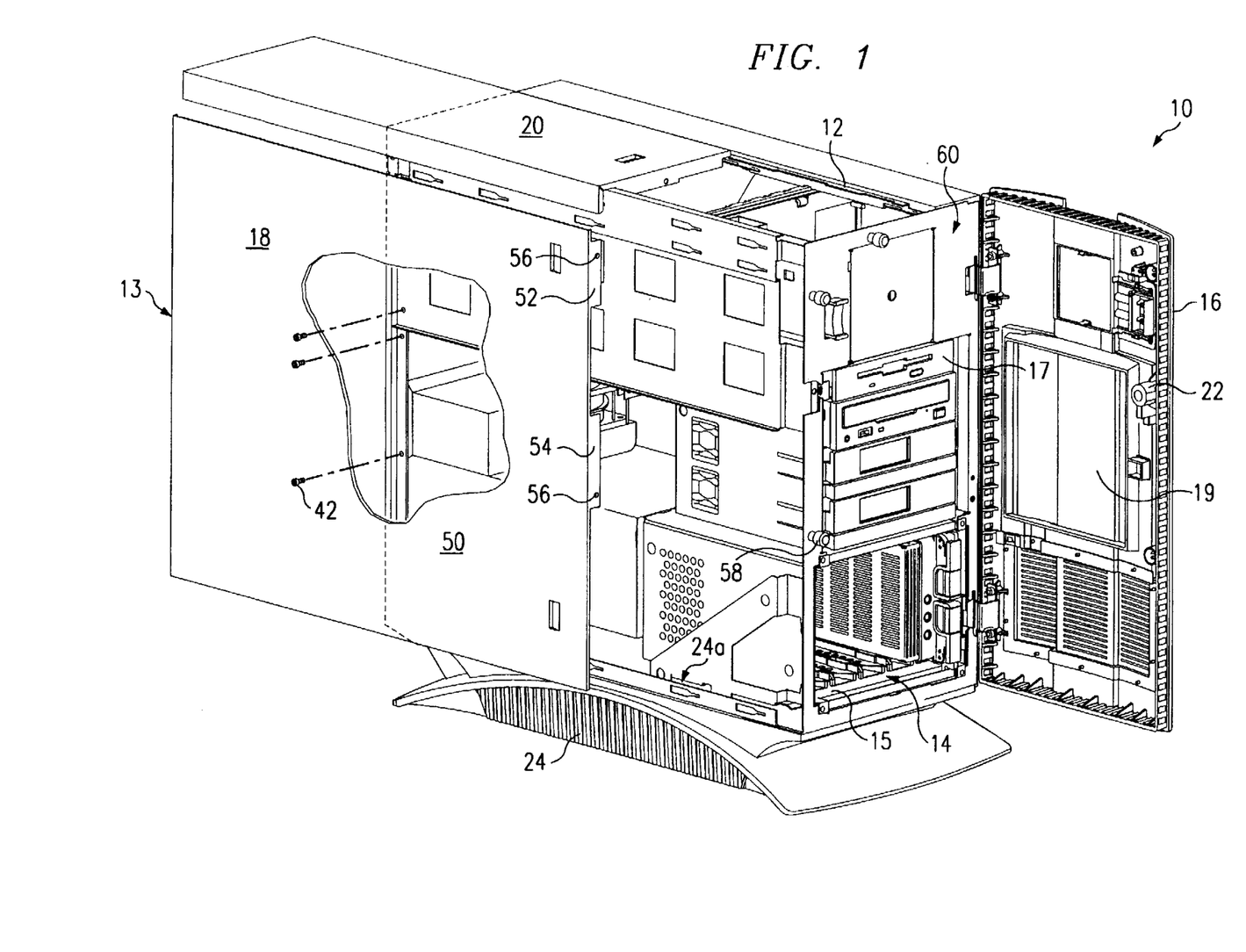
FIG. 1 is a perspective view of a computer chassis constructed in accordance with the principles of the present invention and partially exploded to illustrate the assembly thereof.

Referring first to FIG. 1, there is shown a perspective view of a computer chassis 10 constructed in accordance with the principles of the present invention. The computer chassis 10 is of the tower or free standing form and comprises a chassis frame 12 constructed with a series of chassis panels 13 defining a plurality of compartments 14 adapted for receipt of modular computer components therein. The panels 13 and associated components will be described in more detail below. Access to the components, as well as the compartments 14, is limited in accordance with the principles of the present invention to initial opening of the front panel 16 which is hingedly mounted to frame 12. As will be described below, the frame 12 is constructed so that access to the computer compartments 14 is limited to those regions of the computer that may be secured behind the access panel 16. For example, side panel 18 and top panel 20 are secured to frame 12 by securement devices which may only be accessed once the front panel 16 is opened. Cage 15, which is secured behind front panel 16, is adapted for hot pluggable drives. Non-hot pluggable drives may be used in lieu thereof in the event a hot pluggable drive is not necessary, and all may be secured. The non-hot pluggable drive is utilized by replacing the cage 15 with one for non-hot pluggable drives. In this manner, locking of the front panel 16 through locking mechanism 22 may render the entire computer chassis 10 including the hot pluggable drives secure in accordance with the operator's discretion.

Still referring to FIG. 1, the frame 12 upstands from a base 24. Feet are often used for tower units. For example, U.S. Pat. No. 5,388,792, assigned to the assignee of the present invention teaches a pivotable computer tower support foot apparatus. In the present embodiment of the invention, the base 24 is installable without screws and is locked into position with a lock latch 24A (seen most clearly in FIG. 5). The lock latch 24A is accessible through panel 18 and permits the attachment and detachment of base 24 without the need for tools. The base 24 further comprises an aesthetically contoured assembly adapted for an upstanding orientation of the chassis frame 12 once locked into position. In yet another use mode, the base 24 may be removed by releasing the lock latch 24A so that the chassis 10 can be rack mounted. This rack mounted configuration will be discussed in FIG. 5. Other assemblies and orientations are also feasible in accordance with the principles of the present invention, as long as the panels 18 and 20 of the chassis frame 12 can be accessed for removal in the event that a module must be repaired or replaced.

Figure 2:
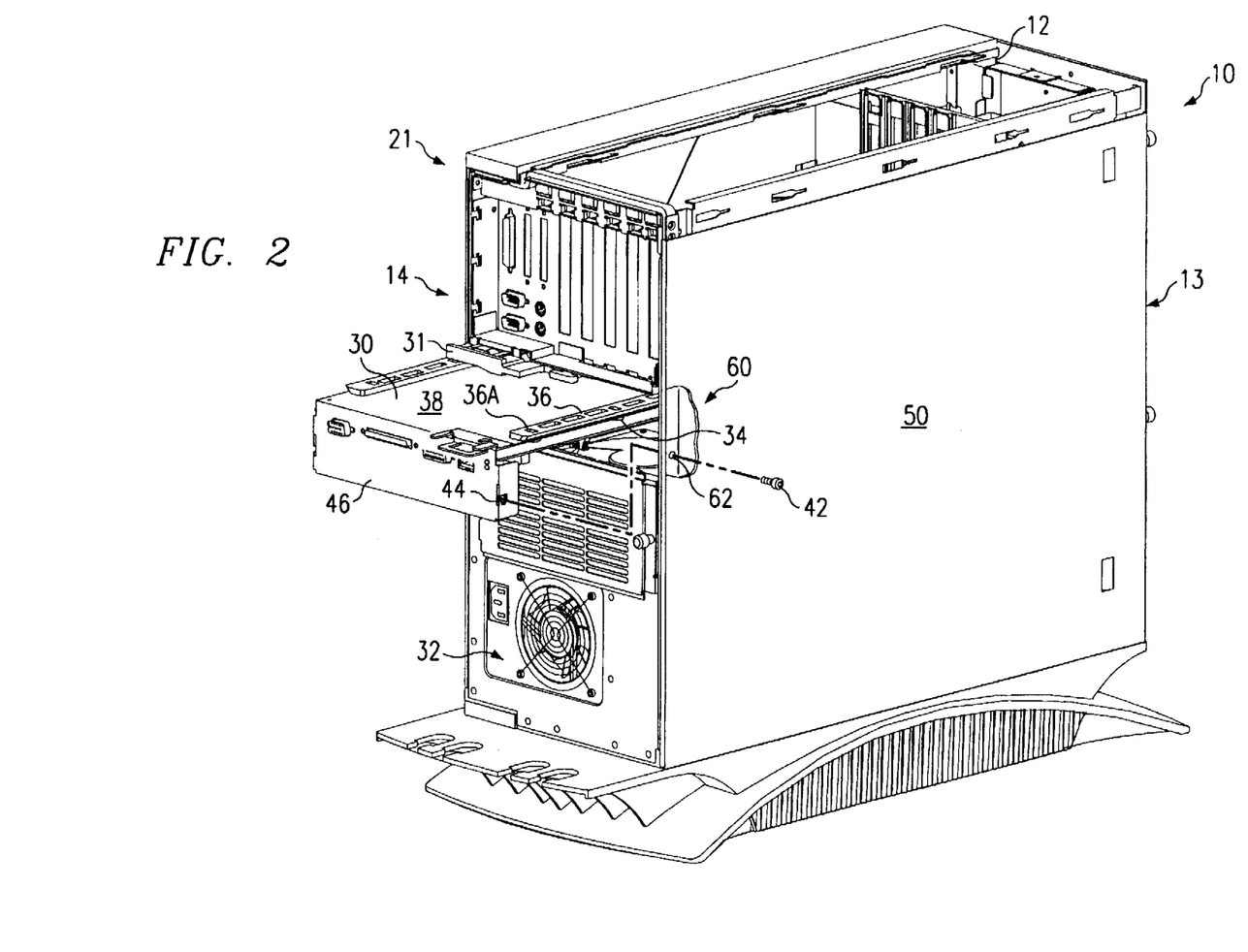
FIG. 2 is a perspective view of the computer chassis of FIG. 1 taken from the rear thereof and shown with sections removed to further illustrate the assembly thereof.

Referring now to FIG. 2, there is shown a rear perspective view of the computer chassis 10 of FIG. 1 illustrating the access to the rear portion 21 thereof. The rear portion 21 of the chassis 10 is constructed with the same compartments 14 as described above. The compartments 14 house various computer components such as a rear access system board 30, system I/O module and fan module 32. In this particular view, a system board 30 is illustrated in a position of partial extraction from the chassis frame 12. An ejector handle 31 is also shown in this view as described below. The extraction of the system board module 30 is afforded by a guidance system 34 comprising guides 36, formed of plastic or the like, which are secured to support plate 38. The guides 36 are constructed for slidable engagement with mounting portions of the frame 12 secured within the compartment 14. The advantage of the plastic guides 36 is that they are cooperable with the support plate 38; being snapped into the plate 38 without the need for screws. Tabs 36A of guides 36, described below, provide the necessary interlocking relationship with plate 38. The snap-fit technology eliminates complexity in computer maintenance and simplifies the installation and removal of computer components in accordance. For example, one set of guides 36 may be unsnapped from the module it is secured with and easily reassembled to the new module for replacement in the computer without the need for screws or tools. The system I/O module is also installed in the same fashion. In this manner, all servicing of and access to the modules can be effected without the need for tools such as screwdrivers, unless it is necessary to remove a coded locking screw.

Still referring to FIG. 2, it may be seen that system board 30 has been accessed from the rear portion 21 of the computer chassis 10. This access could, however, be limited in accordance with the principles of the present invention by locking screws 42 which are adapted for receipt into threaded fasteners 44 formed in the mounting head 46 of support plate 38. The screws 42 and other screws used within the chassis frame 12 may be color coded to indicate their function as a threaded locking member accessible only by the removal of various panels 13 of the computer chassis 10. As stated above, the accessibility of the fasteners securing panels 13, such as side panel 18, is only via the front panel 16.

Referring still to FIG. 2, the locking screws 42 are not inserted in the locking member 44 and are only aligned for insertion for purposes of illustration. Had the screws 42 been inserted in threaded fastener 44, it would have been necessary to remove side panel 50 of computer chassis 10 before the screws 42 and system board module 30, system I/O module, and fan module 32 could be withdrawn.

Referring back to FIG. 1, it may be seen that side panel 50 is also constructed with locking flanges 52 and 54. The locking flanges 52 and 54 each include threaded apertures 56 which are adapted for receiving threaded fasteners 58 therein. This view clearly shows that fasteners 58 in the form of captive thumb screws, are mounted in the frontal region 60 of the computer chassis 10. As referenced above, frontal region 60 is disposed behind and secured with, the front panel 16 when said panel is closed thereagainst. Therefore, to access the thumb screw fasteners 58, for permitting removal of side panel 50, front access panel 16 must be opened. Likewise other color coded locking screws 42—42 are shown to illustrate the fact that a variety of modules within chassis 10 may utilize such color coded securement devices.

Referring back to FIG. 2, another feature of the locking screws 42 is shown. Any component contained within a modular compartment 14 of computer chassis 10 that has been secured by color-coded locking screws 42 cannot be removed without first proceeding through front access panel 16. It should be noted, however, that a user may selectively wish to allow access to certain computer components housed within modules 14 without the necessity of restricted access through front panel 16. For example, the system board 30 of FIG. 2 may be freely accessed from the rear 21 of computer chassis 10 as long one or more color-coded locking screws 42 have not been inserted into threaded fastener 44. A portion 60 of side panel 50 is shown cut away illustrating a threaded aperture 62 in frame 12 through which access screw 42 would be inserted.

Figure 3A:
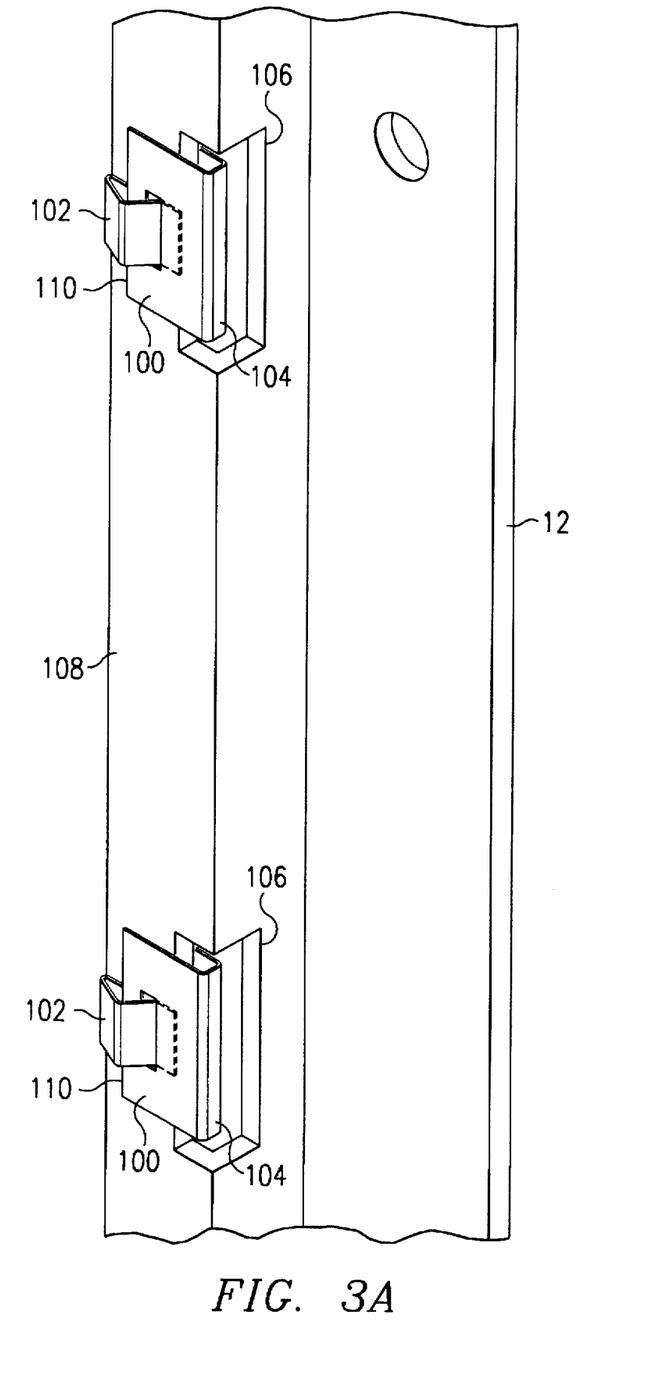
FIGS. 3A and 3B are views of an EMI clip assembly constructed in accordance with the principles of the present invention.
Figure 3B:
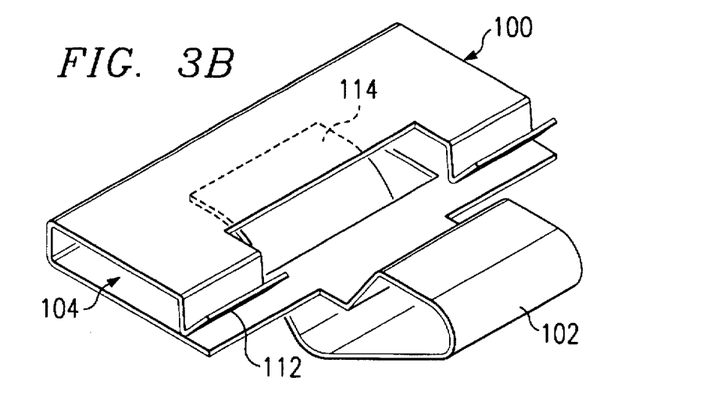

Referring now to FIGS. 3A and 3B, the chassis 10 of the present invention includes a system for electrically grounding individual modules of the computer to the chassis frame 12, and particularly, system boards therein. In accordance therewith, a permanently installed electromagnetic interference, (EMI) clip 100 is thus provided for electrically connecting individual modules to each other and to the frame 12. The EMI clip 100 as shown in FIG. 3A is formed of rolled Beryllium copper, or the like and comprises spring loaded finger section 102 that is biased outwardly. As described below, the clip 100 is designed so that no end edge is exposed in such a way as to interfere with, or snag on other components while providing effective EMI reduction. Such a configuration eliminates a problem which has heretofore plagued the computer industry. It has been known to be necessary to electrically connect various elements of the computer chassis in order to reduce electro magnetic interference (EMI) therein. The use of discrete EMI clips which could be adhered to exposed metal sections of the chassis and/or component frame helped to address this problem. Prior art EMI clips were, however, often prone to becoming detached, bending and/or hanging up on various surfaces. The present clip is formed with all end edges internally disposed relative to the clip. The edges are thus covered once installed in the chassis. This design aspect eliminates a variety of problems.

Still referring to FIG. 3A, the EMI clip 100 of the present invention includes rectangular body section 104 which is sized to engage a slot 106 formed in the appropriate chassis 108 or component assembly. The body section 104 sandwiches a slotted chassis section 110 therebetween with curved finger section 102 extending outwardly for engaging a metal body portion of another component, or the like, assembled thereagainst. Various EMI clip designs are contemplated by the present invention. Each design will accommodate the design parameters of various portions of the chassis. Referring now to FIG. 3B, there is shown an enlarged perspective view of the clip 100 of FIG. 3A. The finger portion 102 is shown to upstand from body portion 104. Ends 112 and 114 are seen to be received within the perimeter of the body section 104 to prevent them from contacting other objects where they could be snagged.

Figure 4:
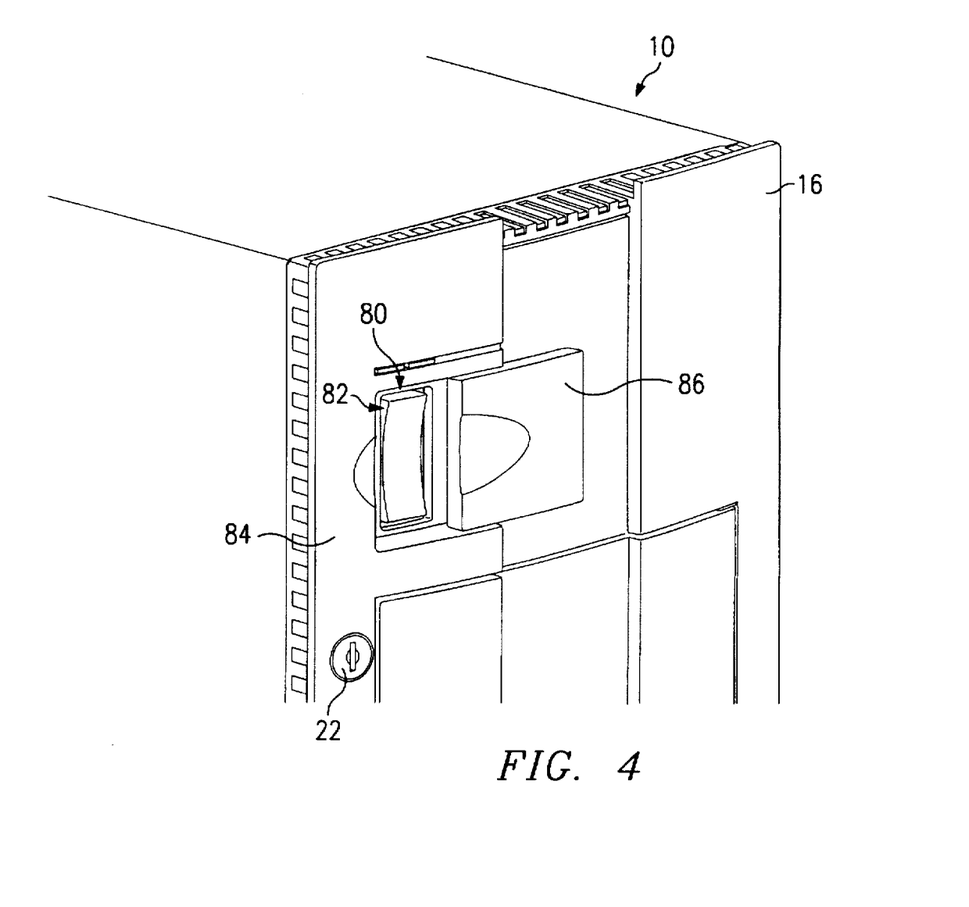
FIG. 4 is an enlarged perspective view of a frontal portion of the computer chassis panel of FIG. 1 illustrating the actuation of the power control switch therein.

Referring now to FIG. 4, there is shown an enlarged, perspective, fragmentary view of the front panel 16 of FIG. 1 in the closed position. In this particular view, it may be seen that front panel 16 includes a power switch 80 secured within a recess 82 on the face 84 of panel 16. The switch, in this particular view, is disposed immediately above the lock 22 described above. In this particular view, a spring loaded switch cover 86 is slidably mounted adjacent to the switch 80 for selective positioning thereover in securement thereof. In this view, the cover 86 is moved to the side of switch 80. Since cover 86 is spring loaded, it will normally stay over the switch 80, giving the chassis 10 an aesthetically clean look. The slidable section 86 may also be secured over the switch 80 by a threaded fastener or the like as described above, and accessible from the inside of panel 16 preventing access to switch 80 from the outside of panel 16. In this manner, the switch 80 may be turned on or off, and the panel 16 secured through lock 22 to prevent access. The user may then have a totally secure computer chassis 10 in which only select components, if any, may be removed therefrom without prior entry through front panel 16. Likewise, the computer may only be turned on or turned off in accordance with the user's discretion.

Referring now to FIGS. 1 and 4, when the front panel 16 is locked, the user has limited access to only the floppy drives 17 through panel door 19. In this manner, normal operation and operator interface is not effected, while every other module is selectively securable. As discussed above with color coded screws 42—42 the entire chassis 10 is secured.

Figure 5A:
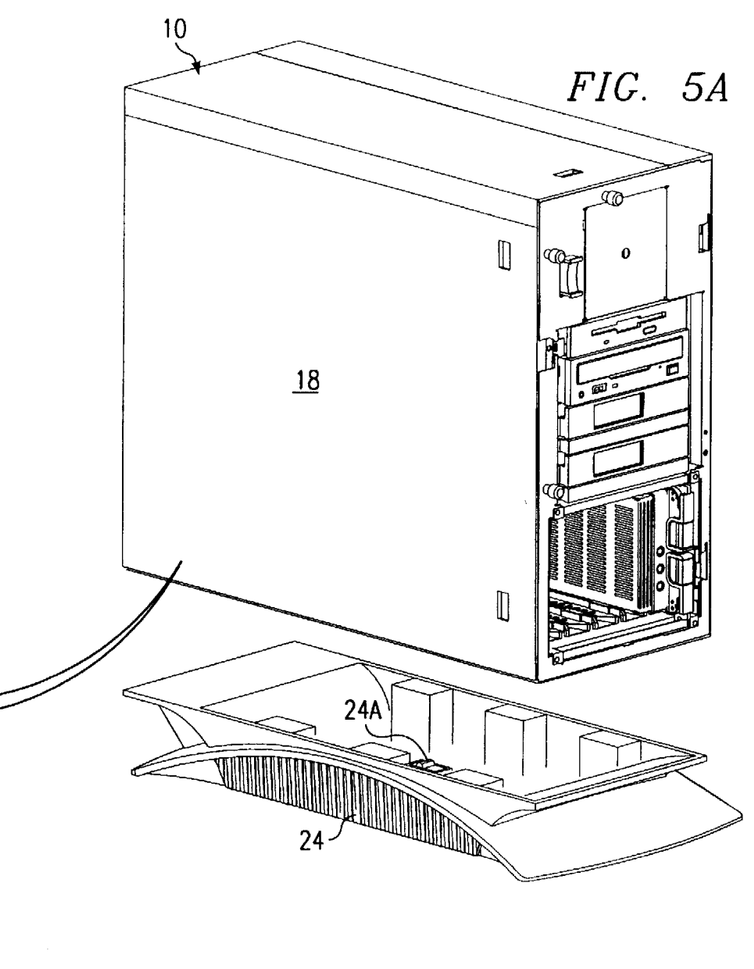
FIG. 5 is a diagrammatic, perspective view of the chassis computer of the present invention illustrating the use thereof in both free standing and rack mounted configurations.
Figure 5B:
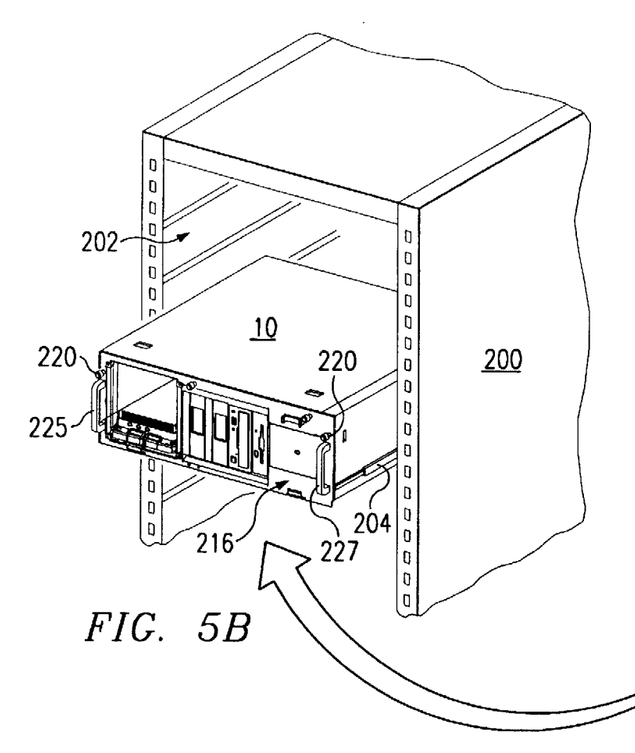

Referring now to FIG. 5, there is shown a diagrammatical representation of the computer chassis 10 of the present invention in both free standing and rack mounted configurations. The computer chassis 10 is constructed for ease in disassembly from the base 24 to provide a unit that is specifically adapted for rack mounting. In this regard, the computer chassis 10 of FIG. 5 is illustrated in an exploded view relative to base 24. The computer chassis 10 is secured to base 24 through a latch mechanism 24A. Access to the latch mechanism 24A is availed through the side wall panel 18 of the computer chassis 10. By removing the side wall panel 18 as set forth above, the latch 24A may be accessed and released to allow the computer chassis 10 to be prepared for assembly in a computer rack 200.

Still referring to FIG. 5, the rack 200 is shown with a plurality of rack compartments 202 formed therein. The compartments 202 are each constructed with a slide mechanism 204 adapted for securement to, and support of, a computer chassis 10 placed therein. In order to prepare the computer chassis 10 for such rack mounting, the front panel 16 shown in FIG. 1 is removed and replaced with a front bezel panel 216 adapted for rack mounting for the computer chassis 10. A plurality of screws are used for securing said front bezel panel 216 to the computer chassis 10. The whole chassis is secured to the rack by captive screws 220 which are received by cage nuts in the rack. The front bezel panel 216 is further constructed with a pair of handles 225 and 227 which facilitate the handling thereof. In this manner, the computer chassis 10 may be taken from its free standing, tower configuration atop base 24 and easily placed within a computer rack 200 for interconnection with other equipment installed therein.

Figure 6A:
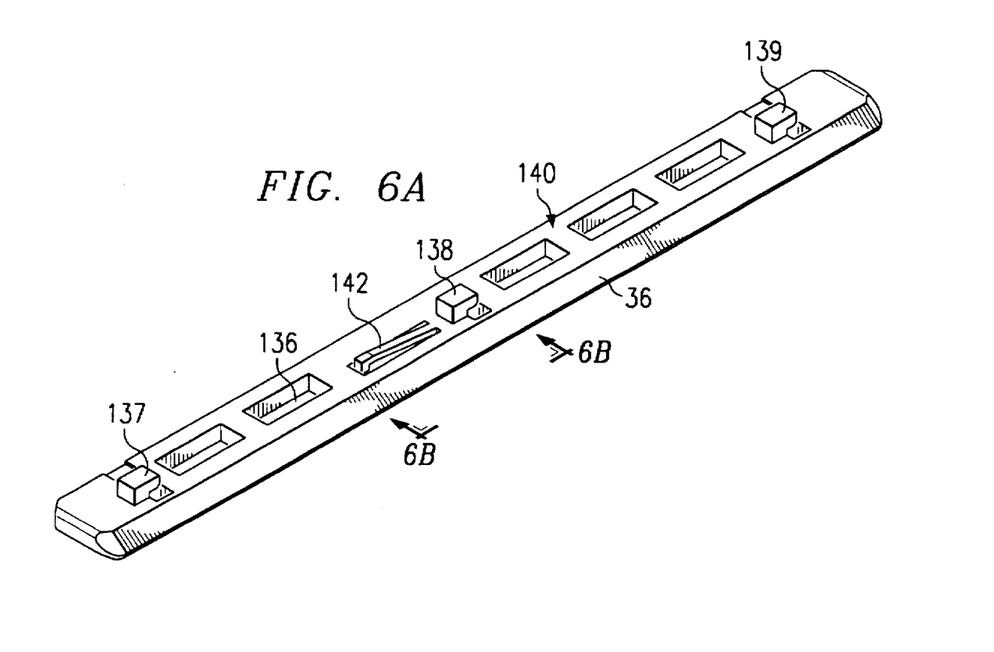
FIGS. 6A, 6B and 6C are views of a guide constructed in accordance with the principles of the present invention.

Referring now to FIG. 6A, there is shown an enlarged, perspective view of a guide 36. Each guide 36 is constructed of plastic, or the like, in an elongate configurations having a plurality of apertures 136 formed therein. In the particular guide 36 shown herein, three generally L-shaped locking flanges 137, 138 and 139 are formed on the bottom side 140 thereof, positioned one from the other in generally parallel spaced relationship. The intermediate locking flange 138 is disposed adjacent an angulated spring member 142 that likewise bears downwardly in the direction of each flange 138.

Figure 6B:
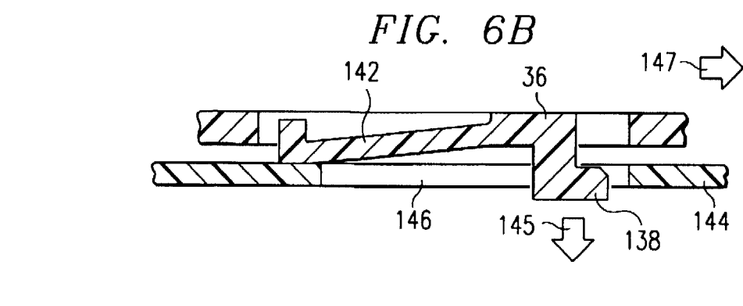
Figure 6C:
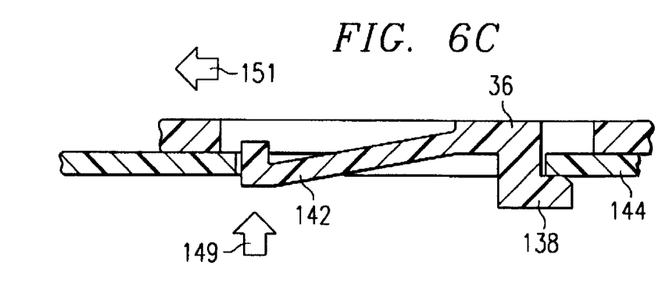

Referring now to FIG. 6B, there is shown an enlarged, fragmentary side elevational, cross sectional view of the guide 36 of FIG. 6A, taken along lines 6B—6B thereof. The guide section therein shown is mounted upon a module 144. The flange 138 is inserted within an aperture 146 formed in the module 144 in the direction of arrow 145. The guide 36 is adapted to slide in a first direction (arrow 147) so as to permit the depending angulated spring member 142 to snap into aperture 146 to lock the guide 36 in place, as shown in FIG. 6C. The guide 36 may, however, be removed from module 144 by pressing the angulated spring member 142 upwardly (arrow 149) to allow the guide 36 to be moved in the opposite direction (arrow 151) for removal. The same guide 36 can be used in a plurality of locations throughout the computer chassis 10 of the present invention.

Figure 7A:
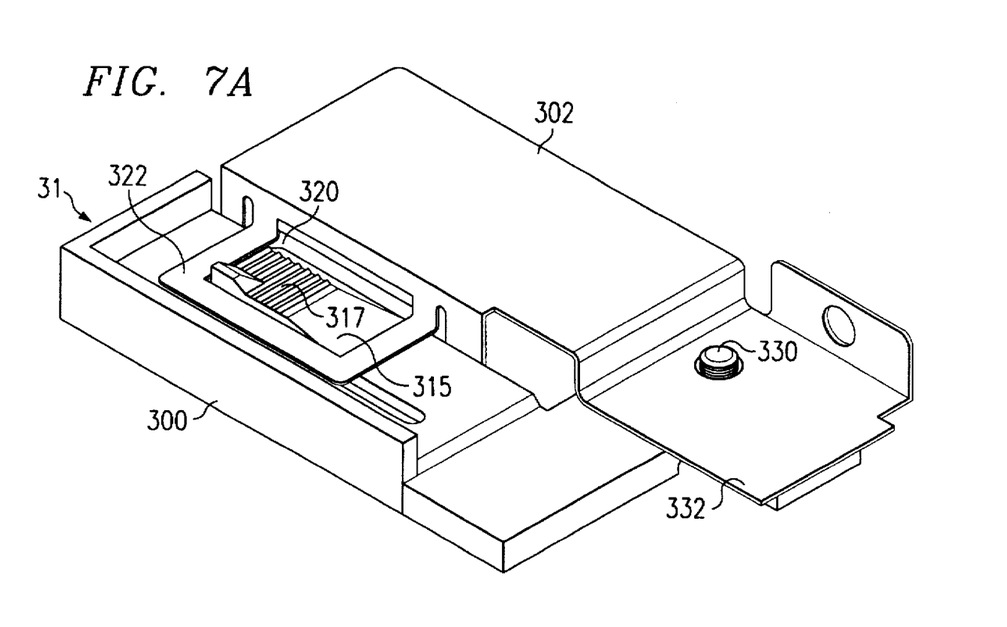
FIGS. 7A and 7B are perspective views of an ejector handle constructed in accordance with the principles of the present invention.

Referring now to FIG. 7A, there is shown an enlarged, perspective view of the ejector handle 31 of the present invention which is preferably formed of plastic or the like. The ejector handle 31 is adapted for securement to individual modules mounted in the computer chassis 10 as shown in FIG. 2. The ejector handle 31 is constructed so as to permit ease and handling of the particular modules being inserted in and or removed from the computer chassis 10.

Still referring to FIG. 7A, the ejector handle 31 comprises a lever 300 which is pivotally mounted about an attachment member 302. The attachment member 302 is made of metal, or the like, and formed for securement to the individual modules placed within the computer chassis 10 (shown in FIG. 2). The lever 300 is adapted for pivotal actuation relative to member 302 for facilitating both the latching and ejection and withdrawal of the computer module from the chassis 10.

Figure 7B:
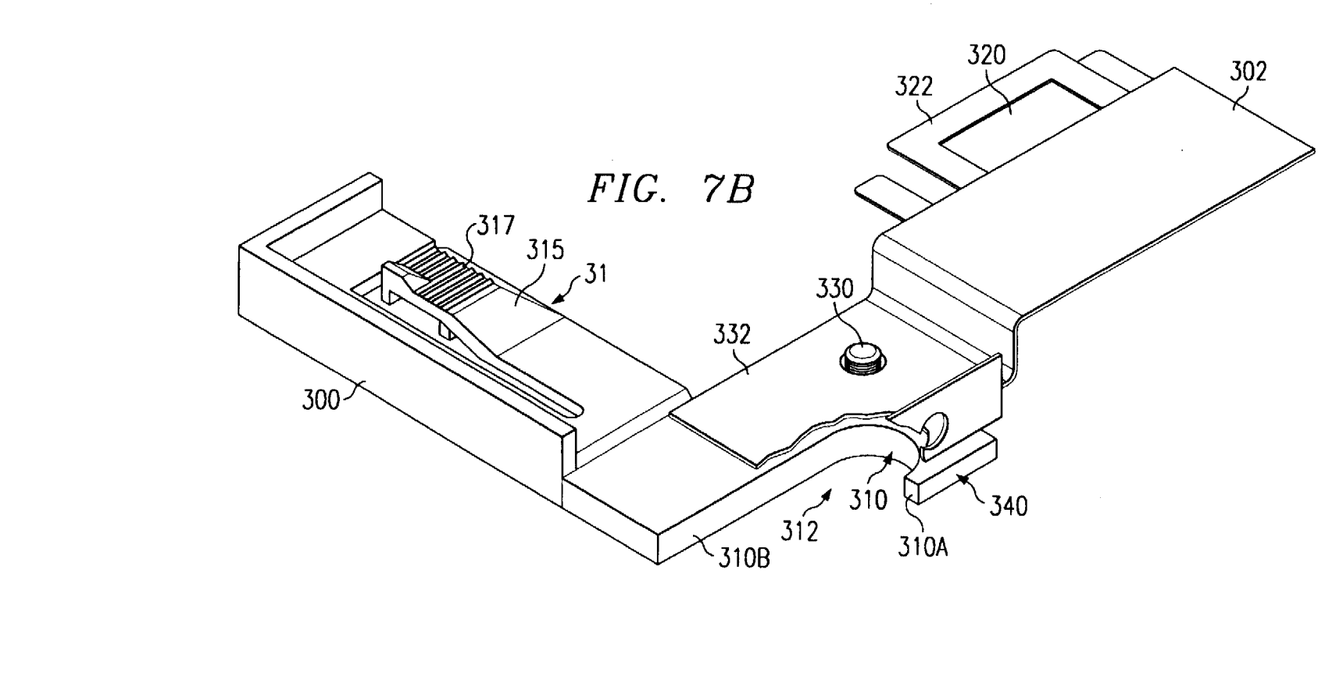

Referring now to FIG. 7B, there is shown a cut-a-way portion of lever 300 illustrating the locking-ejector surface 310 is formed upon a first side 312 of the lever 300 to provide a surface against which locking and ejection can be effected. In this manner, a module that is secured within the computer chassis (FIG. 2) in a configuration that would otherwise be difficult to remove without applying considerable force, may be easily extracted by the pivotal actuation of the lever 300 relative to member 302. Furthermore, once the lever 300 has been used to initially disengage the module, the lever 300 can be used for pulling the module further out of the chassis.

Referring now to FIGS. 7A and 7B in combination, the lever 300 is constructed for releasable, interlocking, pivotal engagement with member 302. A flexible locking tab 315, with serrations 317 formed thereon, is adopted for releasable interlocking positioning within aperture 320 of flange 322. In this manner, tools are not necessary for securing or releasing the module. Pivotal actuation between lever 300 and member 302 then occurs around threaded fastener 330 extending through mounting portion 332 of member 302. The locking-ejector surface 310 is constructed on first side 312 of lever 300 to form a latching hook 340 with surface 310A for securing a latch (not shown) extending from the module (FIG. 2). In FIG. 7B, the lever 300 has been pivoted away from member 302 and latching hook 340 is free to release said latch while surface 310B presses thereagainst to eject the module from the chassis 10 (FIG. 2). It should be noted that various modifications may be necessary to the lever 300 or member 302 for individual modules and/or module locations within the chassis 10.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer chassis comprising:

a housing having a frontal region and a plurality of compartments, said plurality of compartments for receiving modules therein, said housing further including generally planar first and second sides, with said first side being removably attachable to at least one of a base and a rack, and said second side being removably attachable to the rack, such that when said first side is attached to the base said housing is free standing and when said first and second sides are attached to the rack said housing is rack mounted;

at least one module for receipt within one of said plurality of compartments of said housing, said module being constructed for containing computer components;

means for mounting said at least one module within at least one of said plurality of compartments for receipt of a module;

means for securing a module within said compartment of said housing;

a cover panel for said frontal region of said housing;

locking means for securing said cover panel to said housing and preventing the unauthorized entry therethrough; and said means for securing a module being disposed within said housing in regions thereof accessible only through said cover panel, whereby access to all modules of said chassis requires initial access through said cover panel.

2. The apparatus as set forth in claim 1 and further including at least one ejector handle secured to one of said modules and having a curved locking-ejector surface for facilitating the removal of said module from said computer chassis.

3. The apparatus as set forth in claim 1 wherein said cover panel is hingedly mounted to said housing and wherein said locking means comprises a key lock disposed in said hingedly mounted cover panel.

4. The apparatus as set forth in claim 3 wherein said chassis contains at least one compartment for said module being accessible beneath said cover panel.

5. The apparatus as set forth in claim 4 wherein said cover panel is constructed with a panel door for affording limited access to said at least one compartment therebeneath.

6. The apparatus as set forth in claim 5 wherein one of said modules comprises a disk drive adapted for receipt within said at least one compartment and providing said limited access to said disk drive.

7. The apparatus as set forth in claim 1 wherein one of said modules comprises a system processor board module.

8. The apparatus as set forth in claim 1 wherein one of said modules comprises a fan.

9. The apparatus as set forth in claim 1 wherein one of said modules comprises a system I/O module.

10. The apparatus as set forth in claim 1 wherein one of said modules comprises a power supply.

11. The apparatus as set forth in claim 1 wherein said mounting means for said modules in said compartments includes slidable locking members secured to said modules and bracket means secured within said compartments for mating engagement therebetween.

12. The apparatus as set forth in claim 11 wherein said locking members are secured to said modules with interlocking tabs for reducing the number of threaded fasteners from within said housing.

13. The apparatus as set forth in claim 1 wherein said modules are further constructed with an EMI clip secured on portions thereof for electrically interconnecting said compartments of said housing and said modules one to the other for electrical interface therebetween and the reduction of electromagnetic interference.

14. The apparatus as set forth in claim 1 wherein said chassis is further constructed with an EMI clip secured on portions thereof for electrically interconnecting said compartments of said housing and said modules one to the other for electrical interface therebetween and the reduction of electromagnetic interference.

15. The apparatus as set forth in claim 1 wherein said securing means comprises threaded fasteners adapted for securing modules within compartments of said housing, said threaded fastener being accessible only through said cover panel.

16. The apparatus as set forth in claim 15 wherein said threaded fasteners are color-coded to identify them as securing means relative to other fasteners of said housing.

17. A computer chassis comprising:

a housing having a frontal region and a plurality of compartments, said plurality of compartments for receiving modules therein, said housing further including generally planar first and second sides, with said first side being removably attachable to at least one of a base and a rack, and said second side being removably attachable to the rack, such that when said first side is attached to the base said housing is free standing and when said first and second sides are attached to the rack said housing is rack mounted;

at least one module for receipt within one of said plurality of compartment of said housing, said module being constructed for containing computer components;

means for mounting said at least one module within at least one of said plurality of compartments for receipt of a module;

means for securing a module within said compartment of said housing;

at least one ejector handle secured to said at least one module, said at least one ejector handle having curved locking-ejector surface for facilitating the removal of said at least one module therefrom;

a cover for said frontal region of said housing, said cover panel hingedly mounted to said housing;

locking means for securing said cover panel to said housing and preventing the unauthorized entry therethrough; and said means for securing a module being disposed within said housing in regions thereof accessible only through said cover panel, whereby access to all modules of said chassis requires initial access through said cover panel.

18. The apparatus as set forth in claim 17 wherein said chassis contains at least one compartment for said module being accessible beneath said cover panel.

19. The apparatus as set forth in claim 18 wherein said cover panel is constructed with a panel door for affording limited access to said at least one compartment therebeneath.

20. The apparatus as set forth in claim 19 wherein said cover panel is constructed with a panel door for affording limited access to said at least one compartment therebeneath.

21. The apparatus as set forth in claim 20 wherein one of said modules comprises a disk drive adapted for receipt within said at least one compartment and providing said limited access to said disk drive.

22. The apparatus as set forth in claim 17 wherein one of said modules comprises a system processor board module.

23. The apparatus as set forth in claim 17 wherein one of said modules comprises a fan.

24. The apparatus as set forth in claim 17 wherein one of said modules comprises a system I/O module.

25. The apparatus as set forth in claim 17 wherein one of said modules comprises a power supply.

26. The apparatus as set forth in claim 17 wherein said mounting means for said modules in said compartments includes slidable locking members secured to said modules and bracket means secured within said compartments for mating engagement therebetween.

27. The apparatus as set forth in claim 26 wherein said locking members are secured to said modules with interlocking tabs for reducing the number of threaded fasteners from within said housing.

28. The apparatus as set forth in claim 17 wherein said modules are further constructed with an EMI clip secured on portions thereof for electrically interconnecting said compartments of said housing and said modules one to the other for electrical interface therebetween and the reduction of electromagnetic interference.

29. The apparatus as set forth in claim 17 wherein said chassis is further constructed with an EMI clip secured on portions thereof for electrically interconnecting said compartments of said housing and said modules one to the other for electrical interface therebetween and the reduction of electromagnetic interference.

30. The apparatus as set forth in claim 17 wherein said securing means comprises threaded fasteners adapted for securing modules within compartments of said housing, said threaded fastener being accessible only through said cover panel.

31. The apparatus as set forth in claim 30 wherein said threaded fasteners are color-coded to identify them as securing means relative to other fasteners of said housing.

* * * * *